July 7, 1936.  V. E. SCHMIEDEKNECHT  2,046,792
NONSIPHONING FLOAT VALVE
Filed Oct. 8, 1935   3 Sheets-Sheet 1

INVENTOR.
V. E. Schmiedeknecht,
BY
*J. Clarkson*
ATTORNEYS.

July 7, 1936.  V. E. SCHMIEDEKNECHT  2,046,792
NONSIPHONING FLOAT VALVE
Filed Oct. 8, 1935   3 Sheets-Sheet 2
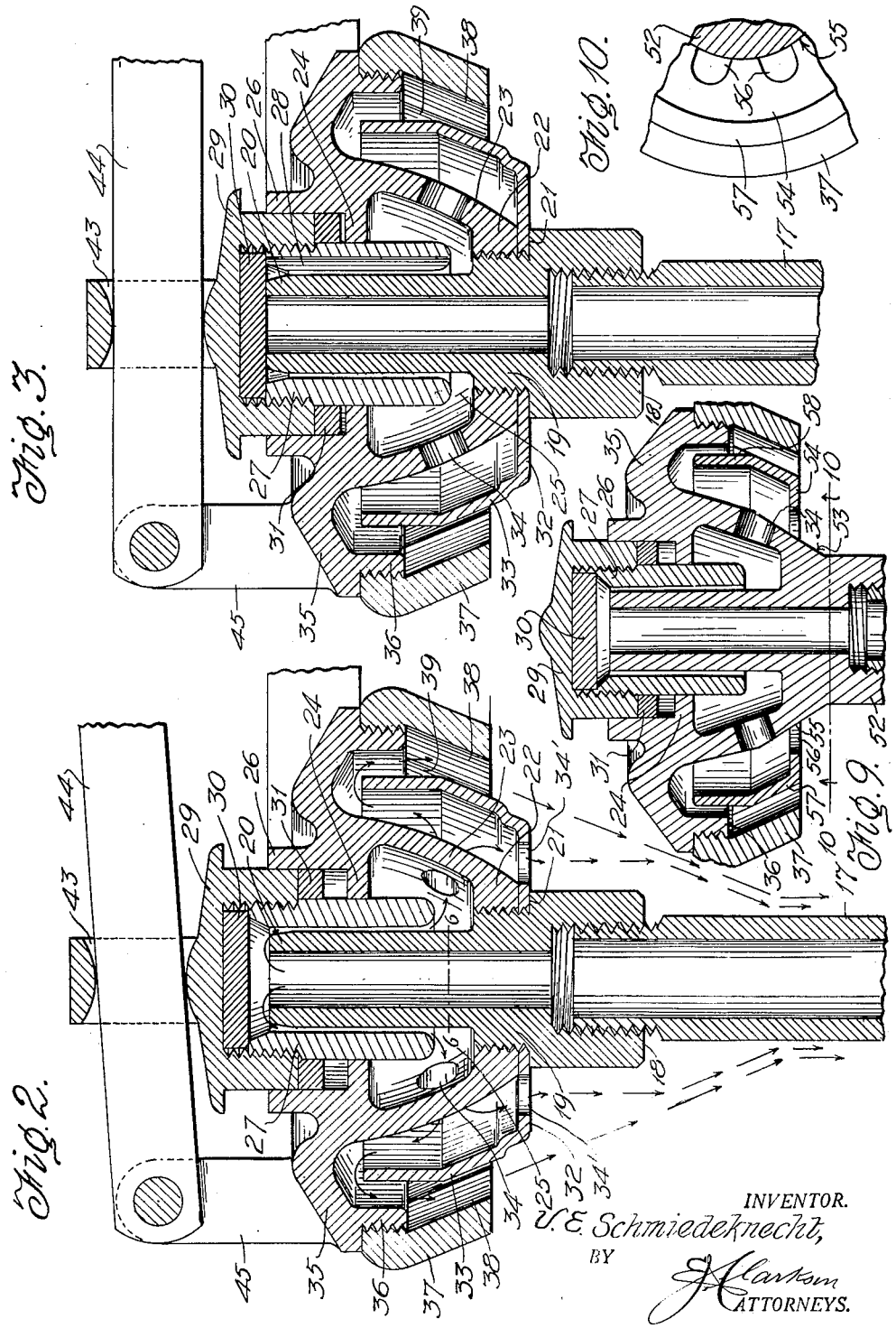
INVENTOR.
V. E. Schmiedeknecht,
BY
ATTORNEYS.

July 7, 1936. V. E. SCHMIEDEKNECHT 2,046,792
NONSIPHONING FLOAT VALVE
Filed Oct. 8, 1935 3 Sheets-Sheet 3
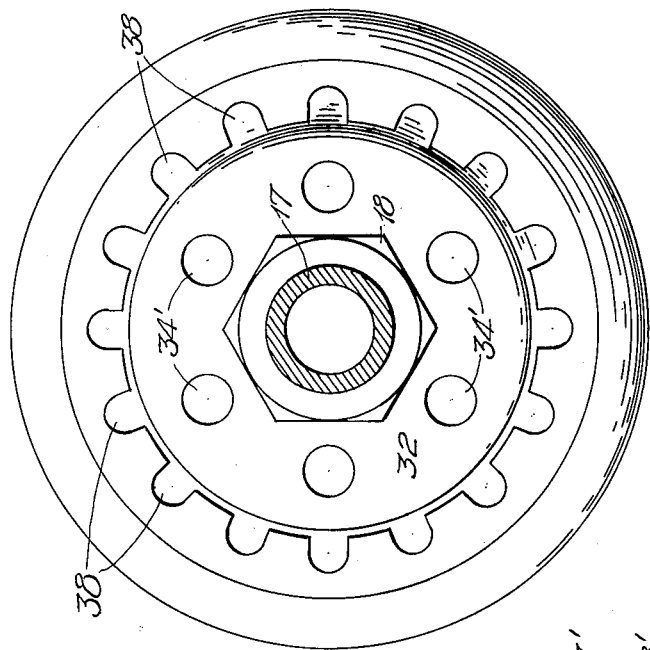
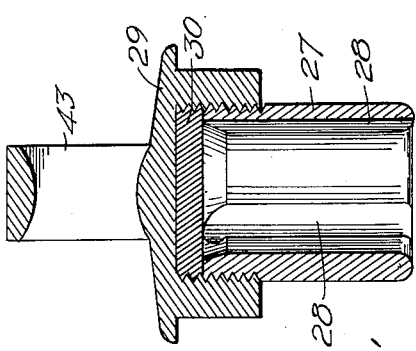
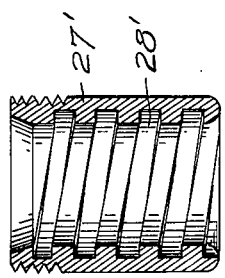
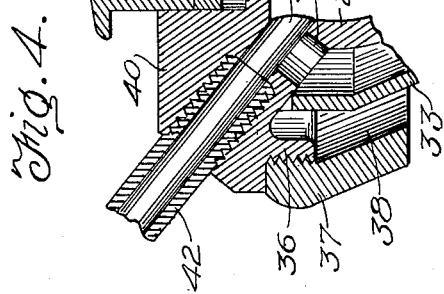
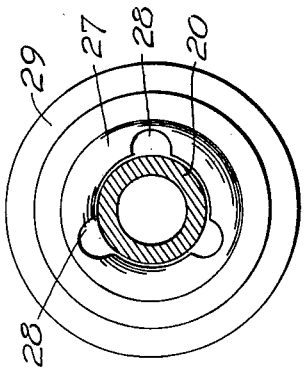
INVENTOR.
V. E. Schmiedeknecht,
BY
ATTORNEYS.

Patented July 7, 1936

2,046,792

UNITED STATES PATENT OFFICE 2,046,792

NONSIPHONING FLOAT VALVE

Victor E. Schmiedeknecht, Louisville, Ky.

Application October 8, 1935, Serial No. 44,084

18 Claims. (Cl. 137—111)

This invention relates to plumbing and has special reference to a non-siphoning float valve for toilet tanks.

In the ordinary type of toilet tank float valves the valve usually discharges under the water in the tank at least part of the time during which the tank is in operation. If, when the valve is open, a valve in the supply line and located at a lower elevation is also opened the upper tank will discharge by siphoning into the supply system thus contaminating the supply water and frequently introducing disease germs into such supply water. Then, if water from the supply line be used for drinking purposes, disease is apt to result.

One important object of the present invention is to provide a ball float valve for toilet tanks which is so arranged that siphoning through the valve of the contents of the tank cannot occur.

In toilet tanks it is highly desirable that the operation should be as quiet as possible. An ordinary ball-cock might be arranged to deliver water to the tank above the high water level of the tank but this is objectionable not only because such delivery is very noisy but also because, for the tank to hold the proper quantity of water and yet have space above the water for the valve, the tank height would necessarily have to be increased and this is objectionable from the practical conditions of utilizing extra space and of inartistic appearance.

A second important object of the invention is to provide a novel construction of such a valve whereby the valve will discharge above the high water level of the tank in a substantially noiseless manner.

A third important object of the invention is to provide a novel arrangement of such a valve having so little height in proportion to its capacity that it may be installed in a tank of the usual height and yet lie wholly above the high water line at all times.

It is common in tanks for this purpose to provide an overflow pipe having unvalved communication with the toilet bowl so that excess water may drain off without overflowing the tank. It is also common to arrange a branch from the float valve to deliver water to this overflow pipe so that, after completion of the flushing operation, a certain amount of water will be delivered to the bowl.

A fourth important object of the invention is to so arrange the valve and branch pipe that no siphoning can occur through this branch pipe.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 2 is an enlarged axial section through the valve in the partly open position shown in Figure 1.

Figure 3 is a view similar to Figure 2 but showing the valve closed.

Figure 4 is a detail vertical section on the center line of Figure 1 and showing the branch pipe connection.

Figure 5 is an axial section through the valve proper and its seating portion removed from the other parts.

Figure 6 is a section on the line 6—6 of Figure 2.

Figure 7 is a bottom view of the valve with the supply pipe shown in section.

Figure 8 is a longitudinal section of a modification of a certain flow reversing tube used herein.

Figure 9 is a view similar to Figure 2 but showing a slight modification thereof.

Figure 10 is a detail section on the line 10—10 of Figure 9.

Figure 1:
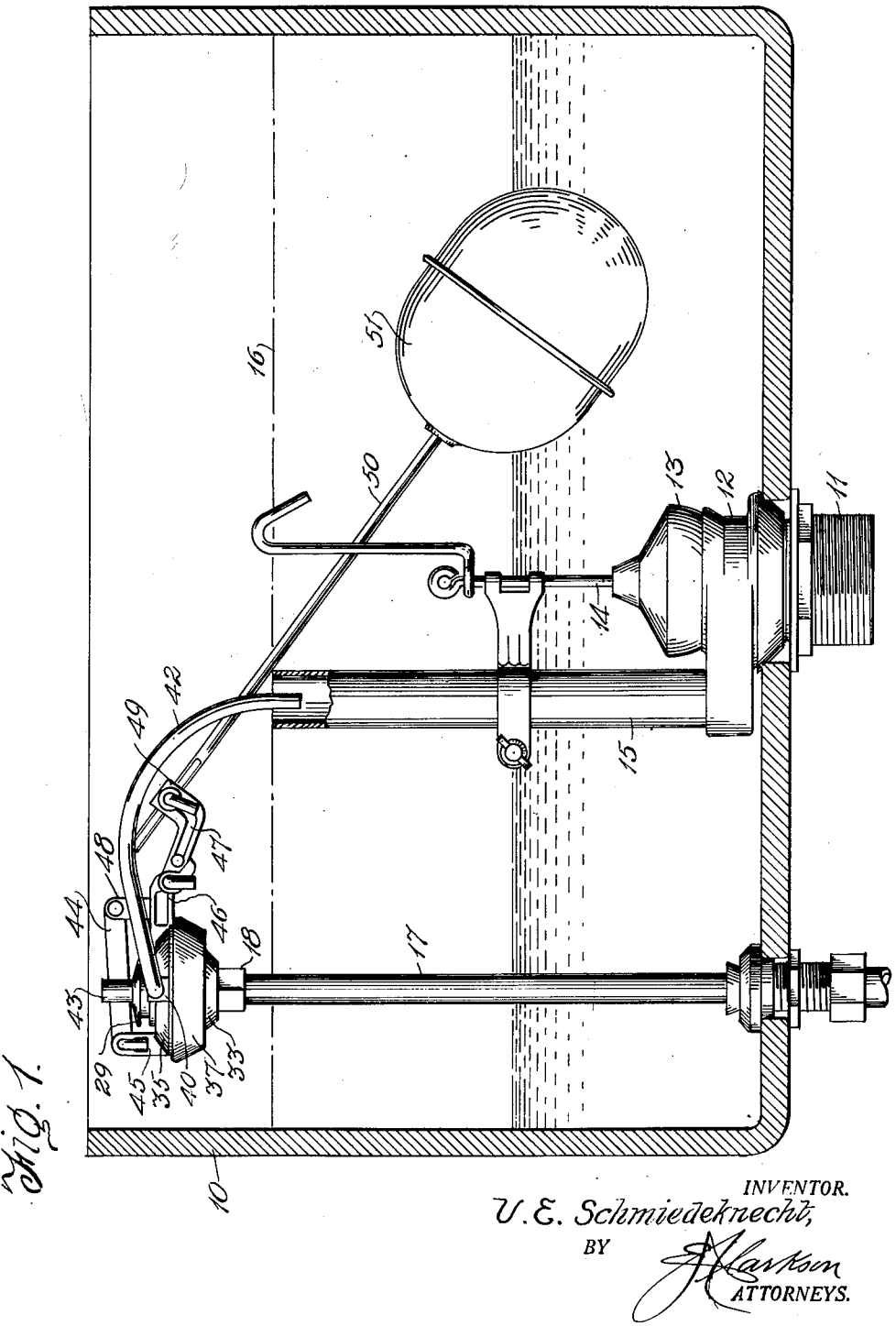
Figure 1 is a section through a tank showing the improved valve installed therein with the valve partly open.

In the embodiment of the invention as here shown there is disclosed in Fig. 1 an ordinary tank 10 as used for this purpose and from the bottom of this tank extends a flush pipe 11 leading to the bowl in the usual manner. The upper end of this pipe is provided with an extension 12 located within the tank at the bottom thereof, this extension being open at its upper end to form a seat for the usual rubber ball 13 forming the flushing valve. This valve 13 is provided with a stem 14 adapted to connect the valve to trip means of the usual character. Leading from the extension 12 below the valve 13 is an overflow pipe 15 which leads up to the high water level shown by the broken line 16. Also the tank is provided with the usual supply pipe 17 which usually does not extend up above the high water level 16. These parts are all of old and well known types and are here shown for the purpose of rendering the construction and operation of the invention entirely clear.

The invention itself resides in the valve at the top of the supply pipe 17 and this valve includes an inner body member of general tubular form. The lower end of this inner body member is formed as a polygonal nut 18 at the upper end of which is a threaded and reduced portion 19 and above this again is a reduced cylindrical tubular portion 20. A shoulder 21 is formed at the junction of the parts 18 and 19 for purposes presently to be explained. These parts 18, 19, and 20 form an outflow terminal for the supply pipe 17. The main or outer body portion has a bottom 22 screwed onto the portion 19 and extending upwardly and outwardly from the periphery of this bottom is a wall 23. Extending inwardly from this wall is a flange 24 so that a chamber 25 is provided around the member 20. A cylindrical flange 26 extends upwardly from the flange 24. The flange 24 forms a circular guide for a flow reversing tube 27 which surrounds the upper end of the part 20 and projects downwardly into the chamber 25. This tube 27 is provided internally with a series of longitudinally extending grooves 28. Screwed on the upper end of the tube 27 is a cap 29 and between the top of the cap 29 and the upper face of the tube 27 is an elastic valve disk 30 which, when the valve is closed, seats on top of the tube 20 to close the upper end thereof as in Fig. 3. The skirt portion of the cap 29 fits in the flange 26 and is provided on its lower end with packing 31 to prevent leakage of water from the chamber 25 between the cap skirt and flange 26. An overflow cup has a bottom 32 centrally apertured to fit on the part 19 and be clamped between the shoulder 21 and the bottom 22. The peripheral wall 33 of this overflow cup extends up around the wall 23 in spaced relation thereto and communication between the chamber 25 and the overflow cup is provided by means of the ports or openings 34 in the wall 23. Extending outwardly and downwardly from the upper end of the wall 23 is a flow reversing flange 35 having an externally threaded depending skirt 36 at its lower end, the flange 35 and skirt 36 being spaced from the cup as shown. Screwed on the skirt 36 is an inverted conical flow directing ring 37 provided with internal grooves 38 separated by ribs 39 which lie close to the cup wall 33. At one point in its circumference the flange 35 is provided with a boss 40 having a flow passage 41 having a branch 41' opening into the overflow cup, or into the space above grooves 38, and to this passage is connected a refill discharge tube 42 having its free end extending down into the overflow tube well below the high water line. In the bottom 32 of the overflow cup are drain ports 34'.

Formed on top of the cap 29 is a loop or eye 43 through which passes a lever 44 having one end pivoted to a bracket 45 extending up from the flange 35. Extending from the flange 35 opposite the bracket 45 is a bracket 46 and a lever 47 is pivoted intermediate its ends to the outer end of the bracket 46. The lever 47 has one end connected to the lever 44 by a link 48 and the remaining end of this lever 47 is provided with an upturned eye 49 through which extends a rod 50 carrying at its free end the usual copper float 51.

In the form of the invention shown in Figures 9 and 10 the inner and outer body members previously described are formed integrally as a single member indicated in general at 52. The lower part of the outer body member has its outer surface 53 in the form of the frustum of a cone. Otherwise the inner and outer body members are identical with those parts previously described and have been correspondingly indicated by reference numerals. The overflow cup of the previous form is, of course, modified since its bottom can no longer be gripped between the shoulder 21 and the bottom of the outer body member. In this modified form of the overflow cup the cup is provided with a bottom 54 having a central circular opening the periphery of which is indicated at 55. Extending outwardly from this opening is a series of slots 56. From the periphery of the bottom 54 rises a frusto-conical wall 57 terminating at its upper end in a cylindrical wall 58. These parts are so proportioned that, when the bottom 54 is fitted on the frusto-conical surface 53, the lower wall 57 fits in the frusto-conical member 37 while the upper wall 58 is spaced from the flange 36. The overflow cup is held immovably between the body member and the member 33. This form of the invention is especially adopted for use in connection with low tanks wherein economy of vertical dimensions is essential.

Normally the valve is closed as in Fig. 2 but when the ball valve 13 is raised by the usual trip mechanism (not shown) the water flows out of the tank and the float 51 falls. The falling of this float lifts the valve proper, composed of the elements 27, 29, and 30, through the action of the lever arrangement. The upper end of the tube 20 will thus be opened and water will flow out by the part 20 into the cap 29 and then down through the grooves 28 into the chamber 25. This chamber, being relatively large will cause the flow of water to decrease in speed so that this chamber forms a speed reducing chamber. From the chamber 25 the water will flow through the lateral ports 34 into the overflow cup, fill this cup and overflow its edges to pass downward through the grooves 38. By reason of the downwardly converging arrangement of these grooves the water both from the grooves and from the drain ports 34' is directed against the upper part of the supply pipe 17 and will flow quietly down the outside of the pipe to join the body of water in the tank without splashing or noise. Obviously, since the lower ends of the grooves 38 are always above the high water line it will be impossible for any siphoning action to draw water from the tank through these grooves.

In Figure 8 it will be seen that there is shown a tube 27' having an internal spiral groove 28'. This tube may be used in place of the straight grooved tube 27.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a valve of the kind described, a supply pipe outflow terminal, a flow reversing device on the upper end of said terminal, a flow checking chamber into which the reversing device discharges, an overflow cup into which the chamber discharges, and means open to the atmosphere to direct the overflow from said cup toward the axis of the terminal.

2. In a valve of the kind described, a supply pipe outflow terminal, a flow reversing device on the upper end of said terminal, a flow checking chamber into which the reversing device discharges, an overflow cup into which the chamber discharges, and means open to the atmosphere to divide the overflow from said cup into a multiplicity of streams and to direct said streams convergingly downward.

3. In a valve of the kind described, a supply pipe outflow terminal, a flow reversing device on the upper end of said terminal, a flow checking chamber into which the reversing device discharges, an overflow cup into which the chamber discharges, and a flow directing ring open at its lower end to the atmosphere and having an inverted frusto-conical interior closely surrounding said cup and provided with a multiplicity of internal grooves directing the overflow from the cup in downwardly converging streams.

4. In a valve of the kind described, a supply pipe outflow terminal, a flow reversing device on the upper end of said terminal, said flow reversing device being movable vertically between a lower position closing the upper end of said terminal and an upper position opening the upper end of said terminal, a flow checking chamber into which the reversing device discharges, an overflow cup into which the chamber discharges, and means open to the atmosphere to direct the overflow from said cup toward the axis of the terminal.

5. In a valve of the kind described, a supply pipe outflow terminal, a flow reversing device on the upper end of said terminal, said flow reversing device being movable vertically between a lower position closing the upper end of said terminal and an upper position opening the upper end of said terminal, a flow checking chamber into which the reversing device discharges, an overflow cup into which the chamber discharges, and means open to the atmosphere to divide the overflow from said cup into a multiplicity of streams and to direct said streams convergingly downward.

6. In a valve of the kind described, a supply pipe outflow terminal, a flow reversing device on the upper end of said terminal, said flow reversing device being movable vertically between a lower position closing the upper end of said terminal and an upper position opening the upper end of said terminal, a flow checking chamber into which the reversing device discharges, an overflow cup into which the chamber discharges, and a flow directing ring open at its lower end to the atmosphere and having an inverted frusto-conical interior closely surrounding said cup and provided with a multiplicity of internal grooves directing the overflow from the cup in downwardly converging streams.

7. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and means open to the atmosphere to direct the overflow from said cup toward the axis of the terminal.

8. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and means open to the atmosphere to divide the overflow from said cup into a multiplicity of streams and to direct said streams convergingly downward.

9. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and a flow directing ring open at its lower end to the atmosphere and having an inverted frusto-conical interior closely surrounding said cup and provided with a multiplicity of internal grooves directing the overflow from the cup in downwardly converging streams.

10. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and means open to the atmosphere to direct the overflow from said cup toward the axis of the terminal, said chamber surrounding said terminal and the cup surrounding the chamber, said chamber having lateral ports communicating with the cup.

11. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and means open to the atmosphere to divide the overflow from said cup into a multiplicity of streams and to direct said streams convergingly downward, said chamber surrounding said terminal and the cup surrounding the chamber, said chamber having lateral ports communicating with the cup.

12. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, and a flow directing ring open at its lower end to the atmosphere and having an inverted frusto-conical interior closely surrounding said cup and provided with a multiplicity of internal grooves directing the overflow from the cup in downwardly converging streams, said chamber surrounding said terminal and the cup surrounding the chamber, said chamber having lateral ports communicating with the cup.

13. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, means open to the atmosphere to direct the overflow from said cup toward the axis of the terminal, a flange extending up from said chamber and into which the cap skirt fits, and packing means below the said skirt and between the flange and tubular member.

14. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, means open to the atmosphere to divide the overflow from said cup into a multiplicity of streams and to direct said streams convergingly downward, a flange extending up from said chamber and into which the cap skirt fits, and packing means below the said skirt and between the flange and tubular member.

15. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, a flow directing ring open at its lower end to the atmosphere and having an inverted frusto-conical interior closely surrounding said cup and provided with a multiplicity of internal grooves directing the overflow from the cup in downwardly converging streams, a flange extending up from said chamber and into which the cap skirt fits, and packing means below the said skirt and between the flange and tubular member.

16. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, means open to the atmosphere to direct the overflow from said cup toward the axis of the terminal, said chamber surrounding said terminal and the cup surrounding the chamber, said chamber having lateral ports communicating with the cup, a flange extending up from said chamber and into which the cap skirt fits, and packing means below the said skirt and between the flange and tubular member.

17. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, means open to the atmosphere to divide the overflow from said cup into a multiplicity of streams and to direct said streams convergingly downward, said chamber surrounding said terminal and the cup surrounding the chamber, said chamber having lateral ports communicating with the cup, a flange extending up from said chamber and into which the cap skirt fits, and packing means below the said skirt and between the flange and tubular member.

18. In a valve of the kind described, a supply pipe outflow terminal, an internally grooved tubular member slidable vertically on the upper end of the terminal, a cap fitted on the upper end of the tubular member and having a skirt surrounding the said upper end, a valve disk in said cap closing the upper end of the terminal upon the tubular member being moved downwardly, a flow checking chamber into which the tubular member projects to discharge therein, an overflow cup into which said chamber discharges, a flow directing ring open at its lower end to the atmosphere and having an inverted frusto-conical interior closely surrounding said cup and provided with a multiplicity of internal grooves directing the overflow from the cup in downwardly converging streams, said chamber surrounding said terminal and the cup surrounding the chamber, said chamber having lateral ports communicating with the cup, a flange extending up from said chamber and into which the cap skirt fits, and packing means below the said skirt and between the flange and tubular member.

VICTOR E. SCHMIEDEKNECHT.